May 29, 1956 C. A. SEGERSTROM 2,748,284

REACTANCE MODULATOR CIRCUITS

Filed July 31, 1952

INVENTOR
CARL A. SEGERSTROM
BY Elmer J. Gorn
ATTORNEY 2,748,284
Patented May 29, 1956

2,748,284

REACTANCE MODULATOR CIRCUITS

Carl A. Segerstrom, Winchester, Mass., assignor to Raytheon Manufacturing Company, Newton, Mass., a corporation of Delaware Application July 31, 1952, Serial No. 301,952

2 Claims. (Cl. 250—36)

This invention relates to reactance modulator circuits for varying the frequency of the output of a radio frequency oscillator.

It is well known that the operating frequency of an oscillator may be varied in response to a modulating signal by connecting the plate-to-cathode space of an electron tube having a control grid in parallel across the frequency-determining circuit of the oscillator and connecting a reactance between the control grid and either the plate or cathode. With such a circuit, the operating frequency of the oscillator can be varied by varying the potential on the grid of the added tube, known as the reactance tube. If an audio-frequency signal is applied to the grid of this tube, the frequency of the oscillator will be changed by an amount determined by the amplitude of the applied signal, and at a rate determined by the frequency of the applied signal. This type of frequency modulation circuit gives a linear variation of the output frequency to the modulating signal over a limited range.

Certain devices have an impedance that varies with the current flowing through them or the voltage applied to them. Devices of this type are known as varistors or thermistors. Semiconductors such as germanium, silicon, and selenium have this property and, in addition, a rectifying action. The impedance of the plate-to-cathode space of a vacuum tube varies in accordance with the potential applied to the grid.

When such a device and a reactance are connected in series, and the two connected across the frequency-determining circuit of an oscillator, the frequency of the associated oscillator can be varied linearly over a wide range by varying the impedance of the nonlinear impedance under control of a modulating signal.

One useful application of this principle is in the central frequency control of a frequency-modulated transmitter. In such a circuit, the frequency to be controlled, or one derived from it, is applied to a discriminator. The output of the discriminator is passed through a low pass filter to become a slowly varying direct current that is proportional to the deviation of the central frequency from the predetermined value. The resulting current after amplification, if necessary, is applied to the nonlinear impedance element to vary the central frequency of the oscillator in a direction to counteract any drift of the central frequency away from the predetermined value, thus maintaining the central frequency at the desired point. Such a system is simpler, more reliable, more easily adjusted, and more economical of components than existing systems for this purpose.

Other and further advantages of this invention will be better understood as the description progresses, reference being had to the accompanying drawings, wherein.

Figures 1, 2, 3, 4, 5:
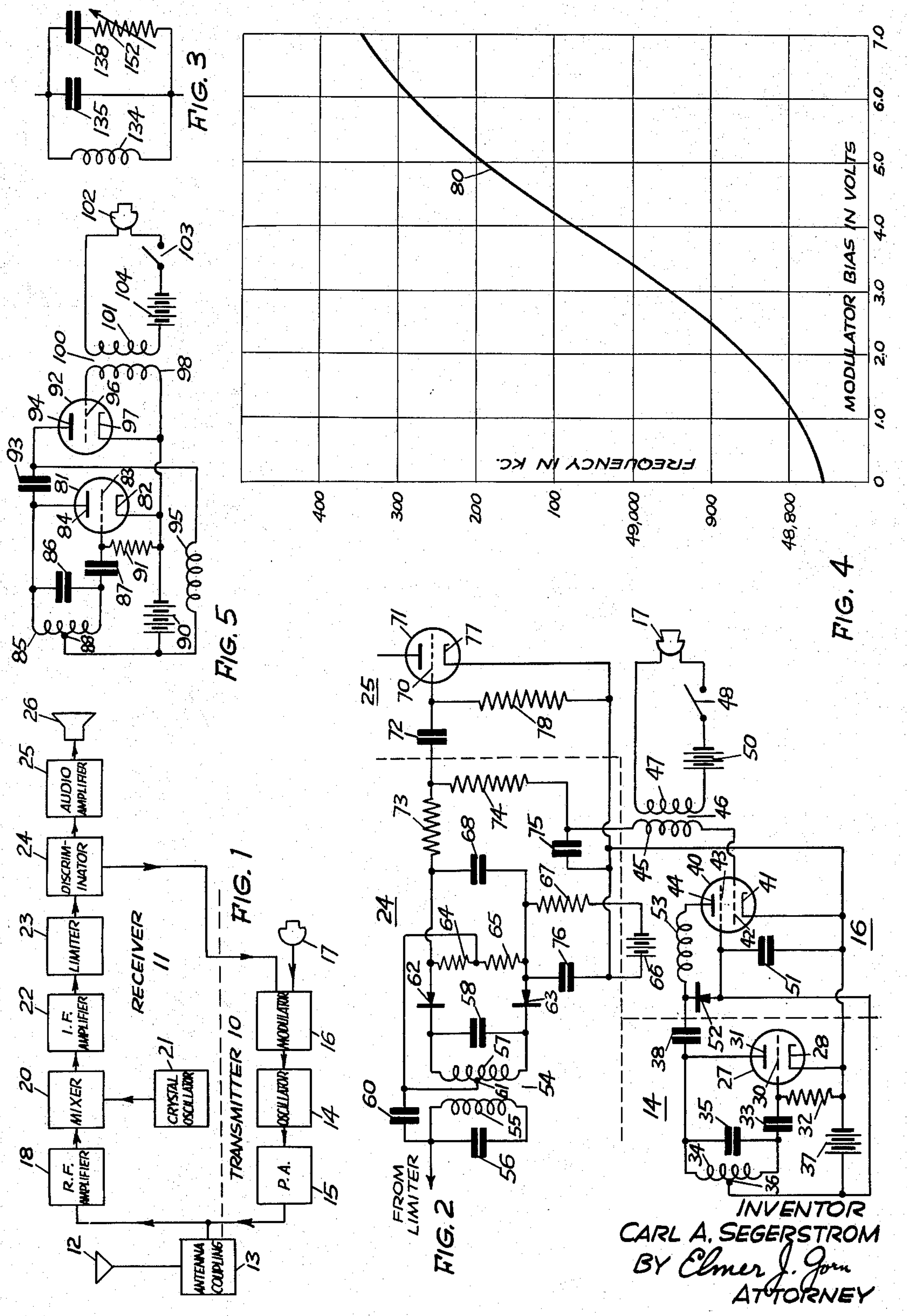
Fig. 1 is a block diagram of a central frequency control circuit for a transceiver incorporating this invention.
Fig. 2 is a schematic circuit diagram of the central frequency control part of the circuit shown in Fig. 1.
Fig. 3 is an equivalent circuit of the frequency-determining part of the circuit of Figs. 1 and 2.
Fig. 4 is a graph of the variation of frequency with biasing voltage obtained from the discriminator of Figs. 1 and 2.
Fig. 5 shows a modification of the invention utilizing a triode.

The transceiver of Fig. 1 is divided into a transmitter section 10 and a receiver section 11. Both sections connect to an antenna 12 through an antenna coupling circuit 13. The transmitter section 10 comprises an oscillator 14, the output of which is amplified by the power amplifier 15 and applied to the antenna 12. The frequency of the oscillator is varied by modulator 16 to which is applied the modulating signal produced by a microphone 17. The receiver section 11 comprises a stage of radio frequency amplification 18, the output of which is applied to a mixer 20. The output of a crystal controlled oscillator 21 is also applied to the mixer 20 to produce intermediate frequency which is amplified in an amplifier 22 before being applied to a limiter 23. The output of limiter 23 is demodulated in a discriminator 24 to reproduce the original information which is applied after amplification in an audio amplifier 25 to a loud speaker 26. The output of the discriminator 24 is also applied to the modulator 16 in a manner to be described later.

The circuits of the transmitter oscillator 14, the modulator 16, and the discriminator 24 are shown in Fig. 2 where the oscillator 14 comprises a triode 27 having a cathode 28, a grid 30, and a plate 31. The grid 30 is connected to the cathode 28 through a resistor 32, the grid 30 is also coupled to the plate 31 through a capacitor 33 and an inductor 34 shunted by a capacitor 35. A tap 36 on the inductor 34 is connected to the cathode 28 through a source of positive potential 37. The plate 31 of the triode 27 is coupled to the modulator 16 through a capacitor 38.

The modulator 16 comprises a tetrode 40 having a cathode 41, a control grid 42, and a screen grid 43 and a plate 44. The cathode 41 is connected to the cathode 28 of the tube 27. The control grid 42 is connected to the output of the discriminator 24 through the secondary 45 of a transformer 46, the primary 47 of which is connected in series with the microphone 17, a switch 48, and a source of potential 50. The screen grid 43 is coupled to the cathode 41 through a capacitor 51, and is also connected directly to the tap 36 and to the plate 44 through a rectifier 52, and a radio frequency choke 53.

The discriminator 24 comprises a transformer 54 with a primary 55 having a capacitor 56 connected across it and a secondary 57 with a capacitor 58 connected across it. A capacitor 60 is connected from one end of the primary 55 to a center tap 61 on the secondary 57. A pair of rectifiers 62 and 63, that may be crystals as shown, or vacuum diodes, is connected one to each end of the secondary 57. Two resistors, 64 and 65, are connected between the output ends of the rectifiers 62 and 63. The point of connection of these resistors, 64 and 65, is connected to the center tap 61. The output end of the output rectifier 63 is connected to a source 66 of negative potential through a resistor 67. A capacitor 68 is connected across the resistors 64 and 65. The output end of rectifier 62 is coupled to the grid 70 of the triode 71 in the audio-frequency amplifier stage 25 through a capacitor 72 and a resistor 73. The point of connection between the resistor 73 and the capacitor 72 is connected to the secondary 45 of the transformer 46 through a resistor 74. The junction of the resistor 74 and the secondary 45 is coupled to the output end of the rectifier 63 through capacitors 75 and 76. The grid 70 of the audio amplifier tube 71 is connected to the cathode 77 by a resistor 78.

In operation as a transmitter, a portion of the transmitting oscillator output is applied after amplification in the radio frequency amplifier 18 to the mixer 20, together with the output of the local crystal oscillator 21, differing from the transmitter frequency by the desired intermediate frequency. The resulting intermediate frequency is amplified in the radio frequency amplifier 22 and fed to the limiter 23, the output of which is demodulated by the discriminator 24 to produce an audio-frequency voltage that has a slowly varying D. C. component proportional to the deviation of the transmitter central frequency from the desired frequency. When the transmitter central frequency differs from the desired frequency, a central intermediate frequency, other than the desired intermediate frequency, is applied to the discriminator 24 and produces a D. C. component that is utilized in the circuit shown in Fig. 2 to correct the transmitter frequency.

In Fig. 2 it will be seen that the output of the discriminator 24 is applied to the grid 42 of the modulator tube 40 through a low pass filter comprising resistors 73 and 74 and a capacitor 75. This permits only the slowly varying direct current component of the output of the discriminator representing the deviation of the central frequency of the transmitter from the desired value to appear at the modulator, together with the modulation supplied from the microphone 17 through the transformer 46. This direct current potential is in series with the negative potential from the source 66 and operates as a negative bias on the grid 42 of the modulator tube 40. This bias varies about a value determined by the fixed bias from the source 66. This varying bias varies the plate current through the cathode 41, plate 44, choke 53, and the rectifier or nonlinear resistor 52. As this current varies, it varies the impedance of the element 52 which is in the radio frequency circuit of the oscillator 14.

It will be seen that the nonlinear resistor 52 and the capacitor 38 are connected in series with each other and shunted across the frequency-determining circuit of the oscillator 14 which comprises the inductor 34 and the capacitor 35. The resulting equivalent circuit is shown in Fig. 3. The inductance L is represented by an inductor 134, the original capacity $C_1$ by the capacitor 135, the nonlinear resistance R by the variable resistor 152, and the associated series capacity $C_2$ by the capacitor 138.

When this circuit is at resonance, the total impedance of the inductive arm, $Z_L$, will equal the total impedance of the capacitive arm, $Z_{ct}$, which can be shown to be:

$$Z_{ct}=\frac{1+j\omega C_2R}{j\omega C_1+j\omega C_2-\omega^2C_1C_2R}$$

It can be seen from an inspection of this formula that the frequency at which the circuit will resonate will be determined in part by the impedance R of the nonlinear resistor, the inductance and the two capacities $C_1$, $C_2$, which last three elements will remain constant.

In a representative circuit, an output of one volt from the frequency discriminator was found to give a deviation of 120 kilocycles in the frequency of an oscillator operating at a central frequency of 49 megacycles. This frequency deviation is shown in Fig. 4 by the graph 80. It will be seen that this graph is substantially linear over a wide range of frequencies.

The same effect can be obtained by modifying the modulator circuit in the manner shown in Fig. 5. A triode 81 having a cathode 82, a grid 83, and a plate 84 is connected as an oscillator with an inductor 85 shunted by a capacitor 86 connected between the plate 84 and the grid 83 through a capacitor 87. A center tap 88 on the inductor 85 is connected to the cathode 82 through a source of positive potential 90. A resistor 91 is connected between the grid 83 and the cathode 82. A triode 92 is connected in series with a capacitor 93 across the triode 81. The plate 94 of the triode 92 is connected to the source 90 of positive potential through a choke 95. The grid 96 of the triode 92 is connected to the cathode 97 through the primary 98 of an audio transformer 100, the secondary 101 of which is connected in series with a microphone 102, a switch 103, and a source of potential 104. With a varying signal from the microphones 102 applied to the grid 96, the impedance of the plate-to-cathode path of the triode 92 will vary. This varies the substantially capacitive impedance shunting the frequency-determining circuit of the oscillator, and as discussed above this changes the operating frequency of the oscillator. A central frequency control voltage can be, of course, applied to the grid 96 instead of, or in addition to, the output of the microphone.

In Figs. 1 and 2, the invention has been shown incorporated in an automatic central frequency control circuit for a frequency modulated transceiver. However, it is apparent that the principle of the invention can be used wherever it is desired to modulate the frequency of the output of an oscillator in response to an electrical potential.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a frequency-modulated oscillator a frequency-determining circuit comprising an inductor and a first capacitor connected in parallel, a second capacitor and a rectifier of the type that varies its impedance with the voltage applied to it connected in series with each other and in parallel across the first capacitor and inductor, and means to vary the voltage applied to the rectifier to determine the operating frequency of the oscillator comprising an electron discharge device having a cathode, a first and second grid and an anode, an inductance connected in series with the rectifier between the anode and second grid and a source of positive potential connected between the second grid and the cathode.

2. In a frequency-modulated oscillator a frequency-determining circuit comprising an inductor and a first capacitor connected in parallel, a second capacitor and crystal rectifier connected in series with each other and in parallel across the first capacitor and inductor, and means to vary the voltage applied to the rectifier to determine the operating frequency of the oscillator comprising an electron discharge device having a cathode, a first and second grid and an anode, an inductance connected in series with the rectifier between the anode and second grid and a source of positive potential connected between the second grid and the cathode.

References Cited in the file of this patent

UNITED STATES PATENTS

| | | |
|---|---|---|
| 2,043,448 | Schuchter | June 9, 1936 |
| 2,182,377 | Guanella | Dec. 5, 1939 |
| 2,408,826 | Vogel | Oct. 8, 1946 |
| 2,422,082 | Crosby | June 10, 1947 |
| 2,480,820 | Hollingsworth | Aug. 30, 1949 |
| 2,610,318 | Clark | Sept. 9, 1952 |

FOREIGN PATENTS

| | | |
|---|---|---|
| 528,860 | Great Britain | Nov. 8, 1940 |
| 551,472 | Great Britain | Feb. 24, 1943 |